Oct. 23, 1956  W. P. EWALD  2,767,918
FLASH EXPOSURE CALCULATOR
Filed Dec. 1, 1954  2 Sheets-Sheet 1

WILLIAM P. EWALD
INVENTOR.

BY

ATTORNEYS

Oct. 23, 1956 W. P. EWALD 2,767,918
FLASH EXPOSURE CALCULATOR
Filed Dec. 1, 1954 2 Sheets-Sheet 2
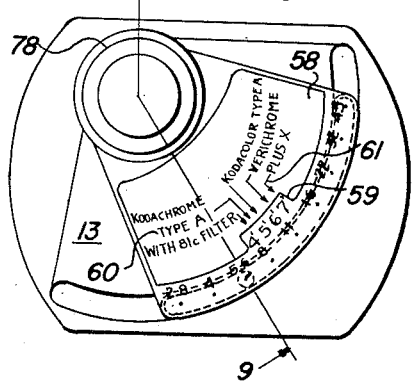
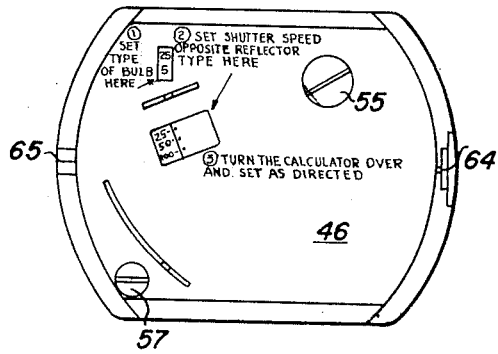
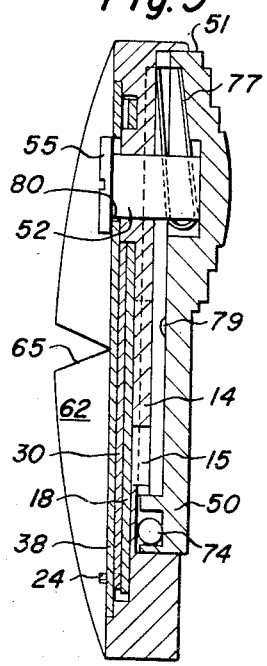
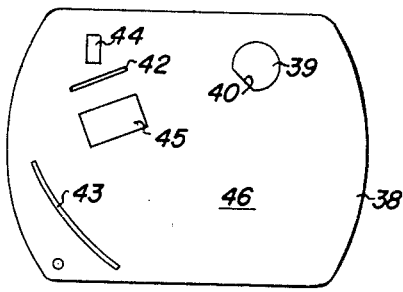
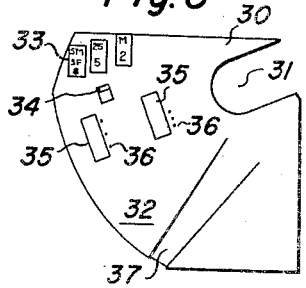
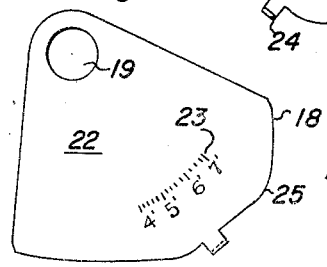
WILLIAM P. EWALD
INVENTOR.
BY
ATTORNEYS United States Patent Office 2,767,918
Patented Oct. 23, 1956

2,767,918
FLASH EXPOSURE CALCULATOR

William P. Ewald, Rochester, N. Y., assignor to Eastman Kodak Company, Rochester, N. Y., a corporation of New Jersey Application December 1, 1954, Serial No. 472,370

15 Claims. (Cl. 235—64.7)

The present invention relates to a photographic computing device or calculator, and more particularly to a recording flash-exposure calculator for obtaining unknown or desired camera adjustment data when the calculator is adjusted for certain preselected or known factors.

In making flash exposures, several variables must be considered, and the camera adjustments made in strict accordance with these variables if the best results are to be secured. These variables are (1) type of flash bulb or lamp used; (2) type of reflector; (3) type of film; (4) shutter speed; (5) distance from the camera object; and (6) the "$f$" number or aperture opening. In order to adjust in accordance with these variables, the present invention provides a calculator in which the proper setting of five of these variables will indicate the correct setting of the sixth. As is usually the case with flash exposures, the first five variables are usually known or may be preselected, and by adjusting the calculator with relation to these known or desired variables, the sixth variable, i. e. the "$f$" number or aperture opening is definitely indicated or determined.

It is a primary object of the present invention to provide a new and improved flash calculator for cameras.

Another object of the invention is the provision of a calculator which provides accurate data of an unknown or desired factor when the calculator is adjusted in accordance with known or preselected factors.

A further object of the invention is the provision of a calculator of the type described which provides the complete information in itself without necessitating reference to other data or tables.

Still another object of the invention is the provision of a calculator in which the adjustments can be easily and simply made, and the results definitely indicated.

A still further object of the invention is the provision of such a calculator which is compact, rugged in structure, comprises few parts, simple to operate, accurate, and highly effective in use.

To these and other ends, the inventive idea resides in certain improvements and combinations of parts, all as will be hereinafter more fully described, the novel features being pointed out in the claims at the end of the specification.

In the drawings:

Fig. 3 is a front view of the assembled calculator ready for use;

Fig. 4 is a rear view of the calculator illustrated in Fig. 3;

Fig. 5 is a rear view of the fixed or rear cover plate;

Fig. 6 is a rear view of the rear slidable plate, showing the relation thereto of the hub and reflector designations;

Fig. 7 is a rear view of the rear pivoted plate, showing the relation of the shutter speed scales thereon;

Fig. 8 is a front view of the plate illustrated in Fig. 7 showing the relation thereto of the height scale; and Fig. 9 is a vertical sectional view taken substantially on line 9—9 of Fig. 3, showing the double fulcrum arrangement for pivoting the front plate to and from ball clamping position.

Similar reference numerals throughout the various views indicated the same parts.

Figure 1:
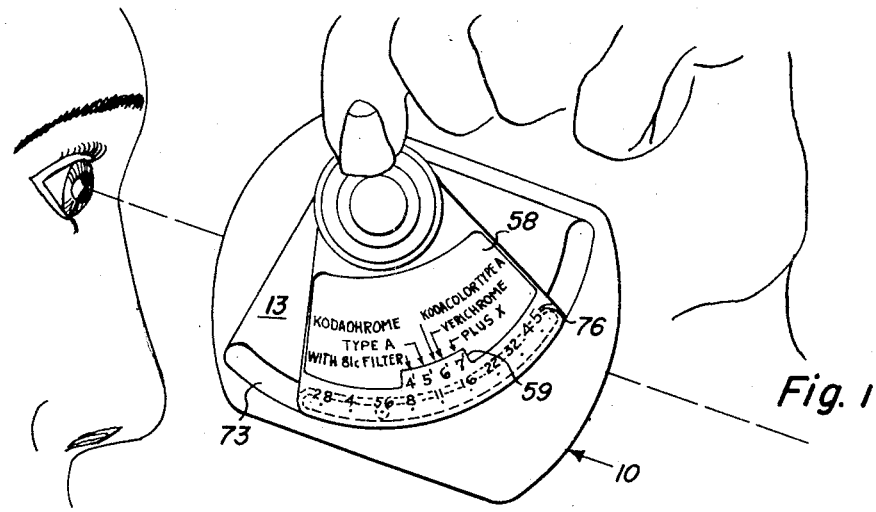
Fig. 1 is a front view of the flash calculator of the present invention, showing the manner of sighting the calculator to determine the distance to the object.

The calculator of the present invention comprises a body portion 10 which may be formed of a suitable opaque material, such as a plastic. The rear of portion 10 is formed with a substantially rectangular recess 11 which is surrounded by a peripheral flange 12. The front of portion 10, on the other hand, is formed with a substantial sector shaped recess 13. The two recesses 11 and 13 are separated by a thin wall 14 having an arcuate opening 15 and a hole 16, the rear of the latter being surrounded by a boss 17, the purpose of which will be later pointed out.

Figure 2:
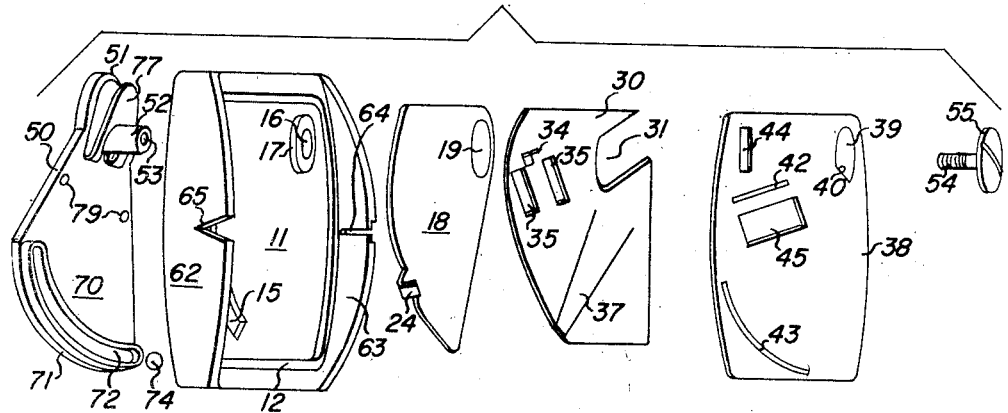
Fig. 2 is an exploded view of the calculator parts, showing the shapes and arrangement of the various parts.

A sector shaped plate 18 is provided with an opening 19 which fits over the boss 17, as is deemed apparent from an inspection of Fig. 2. The rear face 20 of the plate 18 is provided with a plurality of shutter speed scales 21, in the present instance three of these scales are shown, as illustrated in Fig. 7. The front face 22 of the plate 18 is provided with an arcuate shaped height scale 23. The plate 18 also is formed with a rearward extending tongue or lug 24 projecting from the edge 25 thereof.

What may be termed a bulb and reflector plate 30 is also sector shaped and is formed with an open slot 31 for slidably receiving boss 17 to permit lateral sliding of the plate 30 relative to the plate 18 and boss 17, for a purpose to be later described.

The rear surface 32 of plate 30 is provided with three spaced scales 33 which designate the types of flash bulbs or lamps. Just below the lamp scales 33 the plate 30 has formed up therefrom a lug 34 projecting upward from the face 32, as shown in Figs. 2 and 6. In addition, the plate 30 is formed with a pair of apertures 35 which are adapted to cooperate selectively with the shutter speed scales 21 of plate 18. Finally, adjacent each aperture 35 are designations such as different colored dots 36 to designate the different types of reflectors. For example, the top dot may be red in color and may designate a "midget reflector," while the middle dot may be black in color and may represent a "4" x 5" satin or polished reflector," and finally the bottom dot may be blue and may represent an "Ektalux or Lumiclad" reflector. Obviously, the dots 36 may be of different colors than those mentioned above, so long as they clearly indicate to the operator the different types of reflectors under consideration. Also, the plate 30 is formed with a leaf spring member 37 which serves to hold the parts positioned in recess 11 in the back of the body portion in tight relation between the wall 14 and the rear fixed cover plate 38, which will be presently described.

The rear fixed cover plate 38 is substantially rectangular in shape and fits into the recess 11 in the back of the body 10, as is deemed apparent from an inspection of Fig. 2. The plate 38 is provided with an opening 39 which is slightly smaller than boss 17 and overlies the rear surface of the latter. It will be noted that a portion 40 of the edge of opening 39 is chordal or non-circular in shape, the purpose of which structure will be later pointed out. The plate 38 is provided with a straight slot 42 and an arcuate slot 43 through which lugs 34 and 24 respectively extend to the rear of plate 38 so as to be engaged by the operator in setting the parts of the calculator. The plate 38 is also formed with an aperture 44 adapted to cooperate with one of the bulb scales 33. Also, plate 38 has a second aperture to receive screw 57. The rear face 46 of plate 38 may be provided with designations which state the type of reflector for which the calculator is designed. Also, instructions setting forth the steps in setting the calculator may be provided on the face 46 of plate 38.

In making the adjustments, the lug 34 is first slid to the right or left along slot 42 to similarly slide plate 30 to bring the proper bulb or lamp scale 33 into registry with the aperture 44. The device is now adjusted for the type of lamp being used. Fig. 4 shows the lamp adjusted for 25 or 5 type of lamp. This sliding of plate 30 to adjust for the type of lamp used, simultaneously moves one of the apertures 35 of plate 30 under the aperture 45 of plate 38 and over and in registry with one of the speed scales 21 of plate 18. These scales 21 and apertures 35 are so positioned that adjustment of the type of bulb used automatically positions the proper aperture 35 to uncover the proper shutter speed scale 21, which is then visible through aperture 45 of plate 38. Thus, the proper shutter speed scale is selected. Now, the lug 34 is moved along the arcuate slot 43 to rock plate 18 to adjust the visible speed scale 21 with respect to one of the colored dots 36, to adjust the speed scale in accordance with the type of reflector being used. For example, as shown in Fig. 4, the shutter speed scale has been adjusted with the setting of 50 opposite the center dot 6. This is the setting for a shutter speed of 50 for a 4" x 5" satin or polished reflector. With the above adjustments the calculator has been set for the type of lamp, type of reflector and shutter speed.

After these settings have been made, the calculator is turned over to the positions shown in Figs. 1 and 3. A substantial sector shaped member 50 lies in the sector shaped recess 13 in the front of the body portion 10. Adjacent the apex 51 of the member 50, the latter is provided with a rearward extending pin 52 which projects through the hole 16 and the boss 17 to pivot or rockably mount the member 50 in the hole 16 and boss 17, for a purpose to be later described. This pin 52 is formed with a threaded opening 53 adapted to receive the threaded shank 54 of a screw 55 the head of which lies against the cut-away portion 40 of the opening 39, as shown in Figs. 4 and 9, and for a purpose to be later described. This screw 55 serves to secure the plates 18, 30 and 38 to the back of the body portion 10 and in the recess 11, and the leaf spring 37 on the sliding plate 30 holds the parts in tight assembled relation. Also, the screw 55 retains the member 50 in the recess 13, all of which is deemed apparent from an inspection of Fig. 2. If desired, an additional screw 57 may be used to secure the back plate 38 to the wall 14. Thus, the screw 55 holds or mounts all the members or plates on the body portion.

As mentioned above, the front face 22 of plate 18 is provided with height scale 23 which is visible from the front of the calculator through an arcuate slot 15 in wall 14, as illustrated in Figs. 1 and 3. The member 50 is preferably of a transparent material and is provided on the front face thereof with a label or similar member 58 formed with an opening 59 through which the height scale 23 is visible. The member or label 58 is provided with various film designations 60, each of which has associated therewith an arrow 61 directed toward opening 59 so as to be adjusted in relation to the height scale 23. By pivoting the member 50 about pin 52 the arrow 61 of the type of film being used is adjusted with respect to the height of the user of the calculator. For example, if Verichrome film is used and the operator is six feet tall, the arrow 61 associated with the Verichrome film designation is brought into registry with the six foot mark of the height scale 23, as shown in Fig. 1. By this setting, the calculator is now adjusted for the type of film and the height of the operator or user.

At this point the calculator has now been adjusted for (1) type of bulb or lamp, (2) type of reflector, (3) shutter speed, (4) type of film, and (5) height of the user. Now, the distance from the camera to the object and the "f" number or aperture must be determined. To secure this desired adjustment, the calculator is sighted on the base of the object being viewed. It will be apparent that with a fixed distance between the camera and the object, the angle of viewing, see Fig. 1, will vary with the height of the user. This is the purpose of the height scale to take into account the height of the user. To sight the calculator the opposite sides 62 and 63 of the peripheral flange 12 are provided with a pair of aligned sight openings 64 and 65, respectively. With the sight opening 64 near the eye, as shown in Fig. 1, a sight is taken through aligned sight openings 64 and 65 on the bottom of the object being viewed. By this arrangement the angle of adjustment of the calculator is made in strict accordance with the distance to the object.

With the calculator held in this position, Fig. 1, an adjustment is made to determine the unknown or desired quantity, namely, the "f" number or aperture opening. To secure this result, the under side 70 of member 50, adjacent the outer edge 71 thereof, is provided with an arcuate channel or slot 72 which cooperates with a similar shaped channel or slot 73 formed on the front face of the wall 14 to retain in position a movable indicating member in the form of a small metal ball 74. When the member 50 is in one position, ball 74 will be clamped and held in place between the bottoms of the slots 72 and 73. When, however, the member 50 is in another position, the ball is released and may travel along the slots 72 and 73 to assume a vertical position. The front face of member 70 adjacent edge 71 is formed with an arcuate shaped "f" member or aperture scale 76. Adjacent pin 52 the member 50 is provided with a U-shaped spring 77 which presses on the rear face 70 of member 50 on the front face of wall 14.

Now with the calculator in the setting position illustrated in Fig. 1, the operator presses on the point 78 of the member 50 just above the pin 52. Such pressing will serve to move the entire plate assembly to the rear, or left as viewed in Fig. 9, against action of spring 77 which is compressed. Such rearward movement will shift the head of screw 55 away from portion 40 of the fixed cover plate 38. This rearward movement is continued until a pair of protuberances 79 on the rear surface 79 of member 50 finally engage the front surface of the wall 14. Further pressing on point 78 will then serve to rock the member 50 counterclockwise, as viewed in Fig. 9, about the protuberances 79 to move the slot 72 away from slot 73 to free the ball 74. The latter will then roll to a vertical position and in a definite relation to the "f" scale 76 to indicate the correct "f" number or aperture setting. With the parts in the position shown in Fig. 1, the ball 74 will register with the point 5.6 of the scale 76 to indicate that the correct aperture setting is f/5.6. However, it will be difficult for the operator to make or note the reading while sighting or holding the calculator in the proper sighting position so as to make the correct reading.

In order to overcome this difficulty, means is provided for locking or clamping the ball 74 in its adjusted position while the calculator is still held in the sighting position illustrated in Fig. 1. This locking is secured by the operator removing his finger from the point 78 to release the pivoted member 50. Thus, the previously tensioned spring 77 now moves the parts to the right, as viewed in Fig. 9, until the head of screw 55 finally engages the cut-away edge 40 of the opening 39. Further rightward movement of spring 77 will then cause the member 50 and its pin 51 to pivot or fulcrum about point 80 between the head of screw 55 and the portion 40 to rock the member 50 clockwise about fulcrum 80 to move slot 72 into cooperating relation with slot 73 to hold or clamp the ball 74 into its adjusted position. The calculator may then be moved from sighting position, and the adjustment of the ball 74 may be readily observed, the advantages of which are deemed apparent. As the member 50 is of transparent material, the position of the ball is readily visible therethrough and its position with the scale 76 can be easily ascertained. Thus, by setting the calculator with respect to known or preselected factors, such as type of bulb, type of reflector, type of film, shutter speed, height of viewer, and then sighting the calculator on the object being viewed and the releasing of member 50, the ball 74 will move automatically relative to scale 76 to indicate the proper "f" number or aperture to be used in accordance with other preselected factors. This calculator thus enables the operator to adjust certain data and scales in accordance with known or preselected factors associated with flash exposures, and then to secure the remaining desired or unknown factors so that complete information is obtained relative to the making of a flash exposure.

The present invention thus provides a calculator which enables the operator to secure quickly and accurately the desired or necessary data. The calculator is easy to adjust, rugged, easy to operate and accurate in its results.

While only one embodiment of the invention has been disclosed, it is to be understood that the inventive idea may be carried out in a number of ways. This application is, therefore, not to be limited to the precise details described, but is intended to cover all variations and modifications which fall within the scope of the appended claims.

What I claim and desire to secure by Letters Patent of the United States is as follows:

1. An exposure calculator comprising, in combination, a body portion, a plurality of relatively adjustable superposed members carried by said portion, said members being provided with designations adjustable relatively in accordance with preselected factors relating to type of bulb, type of reflector, type of film, height of user and shutter speed, one of said members having an "f" number designation, sighting means on said body portion positionable on an object to be viewed, and a movable indicating member carried by said body portion and movable relative to said "f" number designation, the positioning of said sighting means on the object after the adjustment of said members in accordance with the preselected factors serves to move and adjust said indicating member relative to said "f" number designation and to cooperate therewith to indicate the proper "f" number.

2. An exposure calculator comprising, in combination, a body portion, a plurality of relatively adjustable superposed members carried by said portion, said members being provided with designations adjustable relatively in accordance with preselected factors relating to type of bulb, type of reflector, type of film, height of user and shutter speed, one of said members having an "f" number designation, sighting means on said body portion positionable on an object to be viewed, a movable indicating member carried by said body portion and movable relative to said "f" number designation, the positioning of said sighting means on the object after the adjustment of said members in accordance with the preselected factors serves to move and adjust said indicating member relative to said "f" number designation and to cooperate therewith to indicate the proper "f" number, and clamping means on said one member to clamp said positioned indicating member between said one member and said body portion to retain the indicating member in its adjusted position to indicate the "f" number.

3. An exposure calculator comprising, in combination, a body portion, a plurality of relatively adjustable superposed members carried by said portion, said members being provided with designations adjustable relatively in accordance with preselected factors relating to type of bulb, type of reflector, type of film, height of user and shutter speed, one of said members having an "f" number designation, sighting means on said body portion positionable on an object to be viewed, a movable indicating member carried by said body portion and movable relative to said "f" number designation, the positioning of said sighting means on the object after the adjustment of said members in accordance with the preselected factors serves to move and adjust said indicating member relative to said "f" number designation and to cooperate therewith to indicate the proper "f" number, means cooperating with the positioned indicating member to hold the latter in its adjusted portion relative to the "f" number designation.

4. An exposure calculator comprising, in combination, a body portion, a plurality of relatively adjustable superposed members carried by said portion, said members being provided with designations adjustable relatively in accordance with preselected factors relating to type of bulb, type of reflector, type of film, height of user and shutter speed, one of said members having an "f" number designation, sighting means on said body portion positionable on an object to be viewed, a movable indicating member carried by said body portion and movable relative to said "f" number designation, the positioning of said sighting means on the object after the adjustment of said members in accordance with the preselected factors serves to move and adjust said indicating member relative to said "f" number designation and to cooperate therewith to indicate the proper "f" number, means cooperating with the positioned indicating member to hold the latter in its adjusted portion relative to the "f" number designation, and means to move said holding means to an inoperative position to free said indicating member to permit the latter to move over said "f" number designation.

5. An exposure calculator comprising, in combination, a body portion, a plurality of relatively adjustable superposed members carried by said portion, said members being provided with designations adjustable relatively in accordance with preselected factors relating to type of bulb, type of reflector, type of film, height of user and shutter speed, one of said members having an "f" number designation, sighting means on said body portion positionable on the object to be viewed means to rockably mount said one member for movement toward and away from said body portion, means for adjusting said body portion with the member in accordance to the distance of the object being viewed, a movable indicating member carried by said body portion and movable relative to said "f" number designation, the positioning of said sighting means on said object after the members have been adjusted serves to move and adjust said indicating member relative to said "f" number designation and to cooperate therewith to indicate the proper "f" number, means to move said one member to and from clamping relation with said indicating member, and separate fulcrums about which said one member moves.

6. An exposure calculator comprising, in combination, a body portion, a plurality of relatively adjustable superposed members carried by said portion, said members being provided with designations adjustable relatively in accordance with preselected factors relating to type of bulb, type of reflector, type of film, height of user and shutter speed, one of said members having an "f" number designation, sighting means on said body portion positionable on the object to be viewed means to rockably mount said one member for movement toward and away from said body portion, means for adjusting said body portion with the member in accordance to the distance of the object being viewed, a movable indicating member carried by said body portion and movable relative to said "f" number designation, the positioning of said sighting means on said object after the members have been adjusted serves to move and adjust said indicating member relative to said "f" number designation and to cooperate therewith to indicate the proper "f" number, means to move said one member in one direction relative to said body portion to shift said one member into clamping relation with said indicating member to retain the latter in its indicating relation with said "f" number designation, means to move said one member in another direction relative to said body portion to shift said one member out of clamping relation with said indicating member, and fulcrums about which said one member pivots when moved in said directions.

7. An exposure calculator comprising, in combination, a body portion, a plurality of relatively adjustable superposed members carried by said portion, said members being provided with designations adjustable relatively in accordance with preselected factors relating to type of bulb, type of reflector, type of film, height of user and shutter speed, one of said members having an "f" number designation, sighting means on said body portion positionable on the object to be viewed means to rockably mount said one member for movement toward and away from said body portion, means for adjusting said body portion with the member in accordance to the distance being viewed, a movable indicating member carried by said body portion and movable relative to said "f" number designation, the positioning of said sighting means on said object after the members have been adjusted serves to move and adjust said indicating member relative to said "f" number designation and to cooperate therewith to indicate the proper "f" number, means to move said one member in one direction relative to said body portion to shift said one member into clamping relation with said indicating member to retain the latter in its indicating relation with said "f" number designation, means to move said one member in another direction relative to said body portion to shift said one member out of clamping relation with said indicating member, and separate fulcrums about which said member pivots when moved in said direction.

8. An exposure calculator comprising, in combination, a body portion, a plurality of relatively adjustable superposed members carried by said portion, said members being provided with designations adjustable relatively in accordance with preselected factors relating to type of bulb, type of reflector, type of film, height of user and shutter speed, one of said members having an "f" number designation, sighting means on said body portion positionable on the object to be viewed means to rockably mount said one member for movement toward and away from said body portion, means for adjusting said body portion with the member in accordance to the distance of the object being viewed, a movable indicating member carried by said body portion and movable relative to said "f" number designation, the positioning of said sighting means on said object after the members have been adjusted serves to move and adjust said indicating member relative to said "f" number designation and to cooperate therewith to indicate the proper "f" number, spring means to move said one member in one direction relative to said body portion to shift said one member into clamping relation with said indicating member to retain the latter in its indicating relation with said "f" number designation, a fulcrum about which said one member pivots when moved to said clamping relation, said one member being movable in another direction and against the action of said spring, and a separate fulcrum engaged by said one member when the latter is moved in said one direction to rock said member out of clamping relation with said indicating member to free the latter for movement relative to said "f" number designation.

9. An exposure calculator comprising, in combination, a body portion, a fixed back cover plate, a sliding plate and a pivoted plate positioned on one side of said body portion, a pivoted plate positioned in the opposite side of said body portion, said plates being provided with designations adjustable relatively in accordance with preselected factors relating to type of bulb, type of reflector, type of film, height of user and shutter speed, said second pivoted plate being provided with an arcuate "f" number scale, sighting means on said body portion for adjusting simultaneously the positions of at least certain of said plates in accordance with the distance to an object being viewed, a movable indicating member carried by said body portion, cooperating means on said body portion and said second pivoted member to retain said indicating member in cooperating relation with said "f" number scale, the adjustment of said sighting means on said object moving said indicating member relative to the "f" number scale to indicate the "f" number to be used, spring means for rocking said second pivoted member in one direction to move said last member into clamping relation with said indicating member to retain the latter in adjusted relation with the "f" number scale, a fulcrum adjacent the pivot of said second pivoted member about which the last member is rocked by said spring, said second pivoted member being movable in another direction and toward said other member and against the action of said spring, and a second fulcrum about which said second pivoted member is rocked when the latter is moved in said other direction to move said second pivoted member out of clamping relation with said indicating member to free the latter for movement relative to said "f" number scale.

10. An exposure calculator, comprising, in combination, a body portion, a plurality of relatively adjustable superposed members carried by said portion, said members being provided with various data and scales, the scales and data being so related that the adjustments thereof in relation to certain preselected factors will indicate a desired factor, a single means for securing all of said members on said body portion, and cooperating means on said securing means and one of said members to rock another of said members on said body portion.

11. An exposure calculator comprising, in combination, a body portion, a plurality of relatively adjustable superposed members carried by said portion, said members being provided with various data and scales, the scales and data being so related that the adjustments thereof in relation to certain preselected factors will indicate a desired factor, a single means for securing all of said members on said body portion, cooperating means on said securing means and one of said members to rock another of said members in one direction on said body portion, and cooperating means on said other member and said body portion to rock said other member in another direction.

12. An exposure calculator, comprising, in combination, a body portion, a plurality of relatively adjustable superposed members carried by said portion, said member being provided with various data and scales, a movable indicating member carried by said body, the scales and data being so related that the adjustments thereof in relation to certain preselected factors will position said indicating member in an indicating relation with a scale on one member to designate a desired factor, means on said one member cooperating with said body portion for clamping said indicating member in indicating relation with said scale on said one member, means for securing said members on said body portion, and cooperating means on said securing means and said one member to rock the latter in one direction to clamp said indicating members in indicating relation with the scale on said one member.

13. An exposure calculator, comprising, in combination, a body portion, a plurality of relatively adjustable superposed members carried by said portion, said member being provided with various data and scales, a movable indicating member carried by said body, the scales and data being so related that the adjustments thereof in relation to certain preselected factors will position said indicating member in an indicating relation with a scale on one member to designate a desired factor, means on said one member cooperating with said body portion for clamping said indicating member in indicating relation with said scale on said one member, means for securing said members on said body portion, cooperating means on said securing means and said one member to rock the latter in one direction to clamp said indicating member in indicating relation with the scale on said one member, and cooperating means on said one member and said body portion to provide a fulcrum about which said one member may be rocked in another direction to move said one member out of clamping relation with said indicating member.

14. An exposure calculator comprising, in combination, a body portion, a pair of relatively adjustable members positioned on one side of said body portion, a fixed member overlying said adjustable members, an adjustable member positioned on the other side of said portion, said members being provided with various data and scales relating to various camera exposure factors, a movable indicating member carried by the body portion and cooperating with a scale on the last-mentioned adjustable member, the scales and data being so related that the adjustments thereof in relation to certain preselected factors will position the indicating member in a definite relation with the scale on the last-mentioned adjustable member to indicate a desired factor, a single means for mounting all of said members on said body portion, means on said last-mentioned adjustable member movable into clamping relation with said indicating member to retain the latter in indicating position, means for rocking said last-mentioned adjustable member in one direction to move said clamping means into clamping relation with said indicating member, a fulcrum formed between said fixed member and said mounting means and about which said last-mentioned adjustable member rocks to clamping position, and cooperating parts on said body portion and said last-mentioned adjustable member to provide a fulcrum about which said last-mentioned adjustable member may be rocked in the opposite direction and out of clamping relation with said indicating member.

15. An exposure calculator comprising, in combination, a body portion, a pivoted plate on one side of said portion, a slidable plate overlying said pivoted plate, a fixed cover plate overlying said slidable plate, a pivoted plate positioned on the opposite side of said portion from said other plate, a single means for connecting all of said plates to said body portion, said members being provided with various data and scales relating to camera exposure factors, a movable indicating member, means on said body portion and said last pivoted plate to retain said indicating members in operative relation with said last-named pivoted plate, the scales and data being so related that the adjustments thereof in relation to certain preselected factors will serve to position the indicating member in relation to a scale on said last-mentioned pivoted member to indicate a desired factor, spring means carried by said last-mentioned pivoted member and said body portion and tending to rock said last-mentioned pivoted member in one direction to clamp said indicating member between said body portion and said last-mentioned pivoted member to cooperate with said scale in the latter to indicate the desired factor, a fulcrum between said fixed member and said mounting means about which said last-mentioned pivoted member rocks in said one direction, said last-mentioned pivoted member being rockable in the opposite direction to release said indicating means, and cooperating elements on said body portion and said last-mentioned pivoted member to provide a fulcrum about which said last-mentioned pivoted member rocks in said other direction.

No references cited.